US012474066B2

(12) United States Patent
Shimel et al.

(10) Patent No.: US 12,474,066 B2
(45) Date of Patent: Nov. 18, 2025

(54) COMBINATION OVEN WITH INDEPENDENT STEAM GENERATION ELEMENT

(71) Applicant: Alto-Shaam, Inc., Menomonee Falls, WI (US)

(72) Inventors: Joshua J. Shimel, Waukesha, WI (US); Jon Paul Flick, Wales, WI (US); Craig Douglas Burnett, Slinger, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 805 days.

(21) Appl. No.: 17/840,073

(22) Filed: Jun. 14, 2022

(65) Prior Publication Data

US 2022/0404025 A1 Dec. 22, 2022

Related U.S. Application Data

(60) Provisional application No. 63/212,943, filed on Jun. 21, 2021.

(51) Int. Cl.
*F24C 15/32* (2006.01)
*A47J 27/00* (2006.01)
*A47J 27/04* (2006.01)
*A47J 36/32* (2006.01)
*A47J 37/06* (2006.01)
*F24C 7/06* (2006.01)
(Continued)

(52) U.S. Cl.
CPC ........... *F24C 15/327* (2013.01); *A47J 27/004* (2013.01); *A47J 27/04* (2013.01); *A47J 36/32* (2013.01);
(Continued)

(58) Field of Classification Search
CPC ........ A47J 36/32; A47J 37/0641; A47J 27/04; A47J 2201/00; A47J 2027/043; F24C 15/327; F24C 15/08
See application file for complete search history.

(56) References Cited

U.S. PATENT DOCUMENTS 5,680,810 A * 10/1997 Sham ...................... A47J 27/16
126/369
10,684,022 B2 6/2020 McKee et al.
(Continued)

FOREIGN PATENT DOCUMENTS

EP 0942236 9/1999
EP 1767869 A2 3/2007
(Continued)

*Primary Examiner* — Thien S Tran
(74) *Attorney, Agent, or Firm* — Wong Meyer Smith & McConnell

(57) ABSTRACT

A modular oven includes a cabinet receiving separate modules with distinct cooking operations. Modules of the modular oven may provide any combination of convection cooking, steam cooking, impingement cooking, and high speed cooking. Therefore, the modules may be mixed and matched to suit the desired cooking operations. In some embodiments, improved steam cooking at lower cooking temperatures is provided by directing spraying water onto an independent heat source, controlled separately from the cavity heating element, within each cooking zone. By operating a separate heating element specifically for steam generation, there can be more accurate heat control of the cooking zones without overheating the cooking zones when steam is needed but when lower cooking temperatures (e.g., 211 degrees Fahrenheit and below) are desired.

16 Claims, 9 Drawing Sheets

(51) Int. Cl.
  *F24C 7/08* (2006.01)
  *F24C 15/00* (2006.01)
  *F24C 15/08* (2006.01)

(52) U.S. Cl.
  CPC .......... *A47J 37/0641* (2013.01); *F24C 7/067* (2013.01); *F24C 7/085* (2013.01); *F24C 15/003* (2013.01); *F24C 15/08* (2013.01); *A47J 2027/043* (2013.01); *A47J 2201/00* (2013.01)

(56) References Cited

U.S. PATENT DOCUMENTS

| | | | |
|---|---|---|---|
| 10,729,144 | B2 | 8/2020 | McKee et al. |
| 10,890,336 | B2 | 1/2021 | McKee et al. |
| 10,962,230 | B2 | 3/2021 | McKee et al. |
| 10,986,843 | B2 | 4/2021 | McKee et al. |
| 2007/0194003 | A1* | 8/2007 | Hansen ................. F24C 15/327 219/401 |
| 2016/0033141 | A1* | 2/2016 | Rizzuto ................. F24C 7/085 219/396 |
| 2019/0239518 | A1 | 8/2019 | McKee et al. |
| 2021/0120825 | A1 | 4/2021 | McKee et al. |

FOREIGN PATENT DOCUMENTS

| | | |
|---|---|---|
| EP | 2783610 A1 | 10/2014 |
| EP | 2881669 | 6/2019 |
| JP | 2006300486 | 11/2006 |
| KR | 200352193 Y1 * | 3/2004 |
| KR | 200352193 | 6/2004 |
| KR | 102132838 | 7/2020 |

* cited by examiner

| 300 | OVEN HEATER | STEAM HEATER | WATER JET | FAN | |
|---|---|---|---|---|---|
| STEAM OFF | ON | OFF | OFF | ON | HIGH COOK TEMP — 302 |
| | ON/OFF | OFF | OFF | ON | LOW COOK TEMP — 304 |
| STEAM ON | ON | ON | ON | ON | HIGH COOK TEMP — 308 |
| | ON/OFF | ON | ON | ON | LOW COOK TEMP — 310 |

COMBINATION OVEN WITH INDEPENDENT STEAM GENERATION ELEMENT

CROSS REFERENCE TO RELATED APPLICATION

This application claims the benefit of U.S. provisional application 63/212,943 filed Jun. 21, 2021 and hereby incorporated by reference.

BACKGROUND OF THE INVENTION

The present invention relates to ovens for the preparation of food, and in particular, to a combination oven providing separately controlled convection heating and steam generation heating within each cooking zone.

Combination steam and convection ovens ("combi-ovens") cook using combinations of convection and steam. In convection cooking, heated air is circulated rapidly through the cooking compartment to break up insulating, stagnant layers of air around the food, thereby increasing the rate of heat transfer. Higher velocity air typically increases the rate of heat transfer from the air to the food by further disrupting the insulating, stagnant layers of air around the food, as does striking the largest surface of the food with air delivered in a generally perpendicular direction to the food, since perpendicular air is more disruptive to such insulating, stagnant layers of air than air gliding across the largest surface of the food. High humidity further enhances the rate of heat transfer to the food as a result of the high specific heat of water compared to dry air, and such humidity may be used at temperatures approximating the boiling point of water (often called "steam-cooking") or in a superheated state well above the boiling temperature of water (often called "combi-cooking"). Steam can also reduce water loss from the food. Combi-ovens are described, for example, in U.S. Pat. Nos. 7,307,244 and 6,188,045 assigned to the assignee of the present invention and hereby incorporated by reference.

In a common, combi-oven design, steam is generated by spraying water on the fan used for convection air or on structure associated with that fan. This mechanical atomization process breaks up the water into a fine spray that facilitates the generation of steam when the water strikes an adjacent heating coil.

Professional kitchens are often called upon to simultaneously prepare a wide variety of dishes, each one optimally being cooked for different periods of time at different cooking temperatures, optimally according to a schedule that enables multiple different dishes to emerge from the oven at the same time for the purpose of coordinating simultaneous delivery of a variety of "fresh out of the oven" food items to different customers at the same table. U.S. Pat. Nos. 9,677,774 and 9,879,865 also assigned to the assignee of the present invention and hereby incorporated by reference, describe a multi-zone convection oven that can provide independent control of temperature, blower speed, steam generation and cook time for each cooking zone for this purpose.

SUMMARY OF THE INVENTION

The present invention further improves over the prior art by providing improved steam cooking at lower cooking temperatures by directing spraying water onto an independent heat source, controlled separately from the cavity heating element, within each cooking zone. By operating a separate heating element specifically for steam generation, there can be more accurate heat control of the cooking zones without overheating the cooking zones when steam is needed but when lower cooking temperatures (e.g., 211 degrees Fahrenheit and below) are desired.

The present invention provides improved steam generation, particularly for multizone ovens with separate cooking cavities, by providing separate steam generation in each cooking cavity. Separate steam generation is provided by directing spraying water on an auxiliary steam heating element, independent from the cavity heater for convection cooking.

The present invention further improves over the prior art by providing a diverter bracket between the water nozzle and the auxiliary steam heating element to assist with a uniform distribution of water onto the auxiliary steam heating element. The diverter bracket has an upper plate perforated with slots and openings receiving and holding the spraying water. The slots and openings provide narrow slots running along the diverter plate for water to be carried therealong and interrupted by round holes to break the surface tension and allow the water to drip down onto the auxiliary steam heating element for more even distribution of water. A lower plate, also perforated with slots and openings, may be positioned below the auxiliary steam heating element to allow excess water dripping from the auxiliary steam heating element to be caught by the second plate and dispensed from the second diverter plate in a uniform manner.

A helical heater tube, used to heat the cavity during convection cooking or supplement a cavity heater, may surround the diverter bracket to assist with the generation of steam at higher cooking temperatures. The auxiliary steam heating element and the helical heater tube are separately operated to provide independent convection cooking and steam cooking.

The present invention also provides improved control of steam generation, particularly for single cavity ovens and larger cooking zones, for example, single cavity combi-ovens, by providing distinct and independent steam generation using a separately controlled auxiliary steam heating element. By providing a separate auxiliary steam heating element that can be pre-heated prior to the introduction of water and operated separately from the convection heater of the cavity, consistent steam generation volumes and delivery times can be obtained which are independent of the main convection heating. By using a separate auxiliary steam heating element, steam cooking can be accomplished at lower cooking temperatures, e.g., 211 degrees Fahrenheit and below, offering a power savings.

The present invention also provides a modular oven including a cabinet receiving separate modules with distinct cooking operations. Modules of the modular oven may provide any combination of convection cooking, steam cooking, impingement cooking, high speed cooking, and the like. Therefore, the modules may be mixed and matched to suit the desired cooking operations of the user.

Specifically, one embodiment of the present invention provides a combination oven comprising an insulated housing including a door configured to close to define an interior cooking cavity and an opening to provide access to the cooking cavity; a cooking cavity heater communicating with the cooking cavity to heat the cooking cavity; a steam generator for producing steam within the cooking cavity according to a steam production signal, the steam generator having at least one diversion plate providing a plurality of perforations, a water nozzle positioned to direct water onto a top of the at least one diversion plate, and an auxiliary heater extending below at least one of the at least one diversion plate.

It is thus one feature of at least one embodiment of the present invention to provide improved steam generation by providing multiple heated surfaces for water to be dispersed thereon.

A heating coil may extend around the at least one diversion plate.

It is thus one feature of at least one embodiment of the present invention to provide multiple heating sources that are proximate the water and heated surfaces of the plate.

The at least one diversion plate may provide first and second parallel plates.

It is thus one feature of at least one embodiment of the present invention to provide multiple surfaces where water may collect and be evenly dispersed for improved heating of thin layers of water.

The plurality of perforations are rows of slots and dots.

It is thus one feature of at least one embodiment of the present invention to allow water to collect and flow within the longitudinal slots and then drip from the dots by breaking the surface tension allowing the water to be dispersed before being heated by the auxiliar heating element.

The at least one diversion plate may provide first and second parallel plates and the plurality of perforations may be slots extending in a first direction on the first parallel plate and in a second direction on the second parallel plate wherein the first direction and second direction are substantially perpendicular.

It is thus one feature of at least one embodiment of the present invention to provide even distribution of water onto the dispersion plates thus providing more uniform and efficient production of steam.

The first parallel plate may be above the second parallel plate and the first parallel plate may provide upwardly extending sidewalls and the second parallel plate may provide downwardly extending sidewalls.

It is thus one feature of at least one embodiment of the present invention to increase the surface area of the dispersion plates to promote the capture of water from the water jet and allow for more edges for dripping to occur.

A controller may communicate with the cooking cavity heater, steam generator, auxiliary heater, and execute a program stored in memory to independently control the cooking cavity heater and the auxiliary heater according to a power setting of the oven.

A first power setting may generate a steam production signal, turn on the auxiliary heater, and turn on the cooking cavity heater, and a second power setting may generate the steam detection signal, turn on the auxiliary heater, and turn off or pulse on/off the cooking cavity heater.

It is thus one feature of at least one embodiment of the present invention to provide efficiently use of oven heaters for steam operation at low cooking temperatures by turning off the cooking cavity heater and using the steam heater only.

A third power setting may not generate a steam production signal, turn on the auxiliary heater, and turn on the cooking cavity heater, and a second power setting may not generate the steam detection signal, turn off the auxiliary heater, and turn off or pulses on/off the cooking cavity heater.

It is thus one feature of at least one embodiment of the present invention to quickly reach high cooking temperatures augmented by the auxiliary heater of the steam generator in addition to the cooking cavity heater.

An alternative embodiment of the present invention provides a combination oven comprising an insulated housing including a door configured to close to define an interior cooking cavity and an opening to provide access to the cooking cavity; a cooking cavity heater communicating with the cooking cavity to heat the cooking cavity; a steam generator for producing steam within the cooking cavity according to a steam production signal, the steam generator having a water input jet and a steam generator heater independent of the cooking cavity heater; a temperature sensor for sampling a temperature of the cooking cavity to provide a temperature signal; a controller communicating with the cooking cavity heater, steam generator, steam generator heater, temperature sensor, and executing a program stored in memory to: (i) when the cooking cavity heater is operating at a first power setting generate a steam production signal and turn on the steam generator heater, and when the cooking cavity is operating at the second power setting generate the steam detection signal and turn off the steam generator heater; (ii) control the cooking cavity heater according to the temperature signal; and (iii) control the steam generator heater according to the power setting of the oven.

It is thus one feature of at least one embodiment of the present invention to allow for more precise steam generation control that more efficiently and precisely uses energy during low cooking temperatures (e.g., when the cavity heating element is off) but when steam production is desired.

These particular objects and advantages may apply to only some embodiments falling within the claims and thus do not define the scope of the invention.

BRIEF DESCRIPTION OF THE DRAWINGS

FIG. 15 is a chart showing operation of the oven heater, steam heater, water jet and fan during steam operation and convection cooking modes at high and low cooking temperatures.

DETAILED DESCRIPTION OF THE PREFERRED EMBODIMENT

Multizone Oven with Divider Walls

Figure 1:
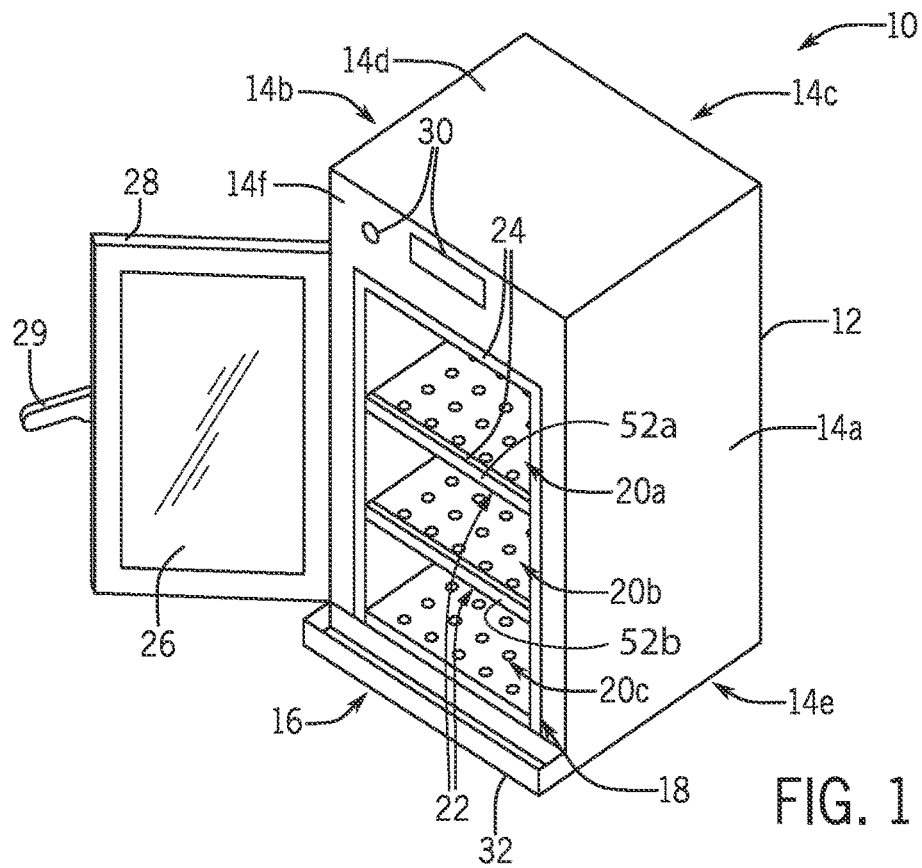
FIG. 1 is a simplified, perspective view of an oven constructed according to one embodiment of the present invention showing a cooking volume divided into cooking cavities by shelf assemblies.

Referring now to FIG. 1, a multizone oven 10 may provide for a housing 12 having upstanding right and left outer side walls 14*a* and 14*b* and upstanding rear wall 14*c* extending therebetween. These three walls 14*a*, 14*b*, 14*c* join generally opposed upper and lower walls 14*d* and 14*e*, the latter providing support so that the oven 10 may rest on a cart or the like (not shown).

The walls 14 enclose a generally rectangular cooking volume 16 having an opening 18 through a front wall 14*f* to provide access to the cooking volume 16 receiving food for cooking. The cooking volume 16 is defined by inner walls 19 (shown in FIG. 2) spaced inwardly from each of the outer walls 14. The cooking volume 16 may be subdivided into cooking cavities 20*a*, 20*b*, and 20*c* (for example) from top to bottom, by means of divider walls 52 as will be described in more detail below.

The perimeter of the oven opening 18 supports an elastomeric gasket 24 that may seal against an inner surface of a glass panel 26 providing an inner surface of a door 28. The door 28 hinges about a vertical axis at the front edge of wall 14*b* to move between open and closed states, the latter sealing the cavities 20*a*-20*c* with respect to the outside air and with respect to each other. The door 28 may be held in the closed state by a latch mechanism and handle 29 as is generally understood in the art. In one embodiment the glass panel 26 of the door 28 extends as a continuous surface over the openings of each of the cavities 20; however, the invention also contemplates separate glass panels or separate doors associated with each of the cavities 20.

An upper portion of the front wall 14*f* may support user controls 30 including input control such as one or more dials and an output display such as an LCD display for communicating with the user. A condensation tray 32 may extend forward from a lower edge of the front wall 14*f* to catch condensation from the inner surface of the glass panel 26 when the door 28 is being opened or closed.

A multizone oven of this general design is discussed in U.S. Pat. No. 10,684,022 assigned to the assignee of the present invention and hereby incorporated by reference.

Figure 2:
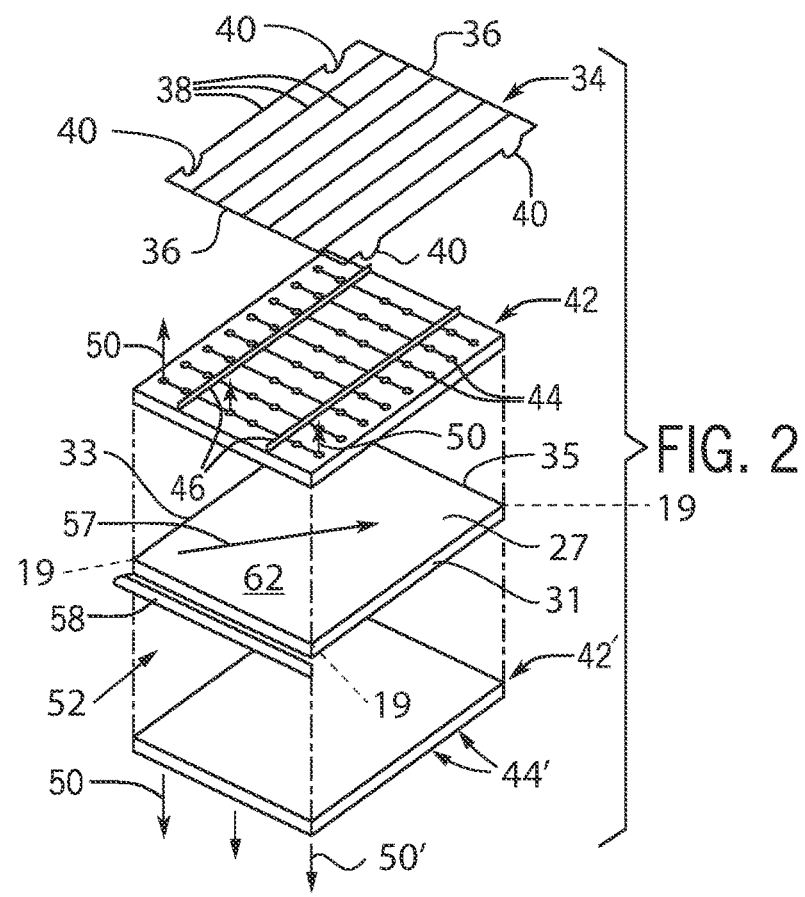
FIG. 2 is an exploded diagram of a removable shelf assembly showing a rack, a lower jet plate (for a higher cavity), and an upper jet plate (for a lower cavity), installed around a divider wall attached to the oven cavity to subdivide the cooking volume into separate cooking cavities.
Figure 3:
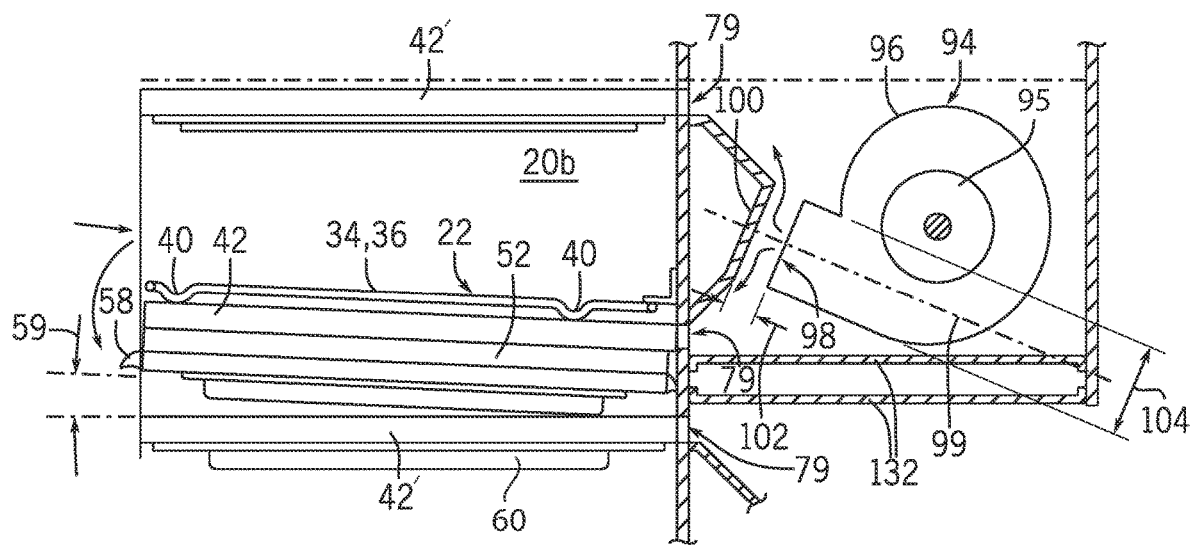
FIG. 3 is a fragmentary, elevational view in cross-section through one cavity of FIG. 1 showing installation of the shelf assembly above and below the divider wall, the rack and lower jet plate compressed against a top of the divider wall and an upper jet plate installed below the diverter wall.

Referring now also to FIGS. 2 and 3, divider walls 52*a*, 52*b* (for example) may be attached to the inner walls 19 of the cooking volume 16 and be vertically spaced to subdivide the cooking volume 16 into cooking cavities 20*a*, 20*b*, and 20*c*. The divider walls 52 may be evenly spaced to provide identically sized cooking cavities 20 or may be unevenly spaced to provide cooking cavities 20 of different sizes. Each divider wall 52 provides a generally rectangular panel 27 sized to extend the full lateral and front to back dimensions of the cooking volume 16 and operating to seal moisture against passage between cooking cavities 20. The right edge 31, left edge 33, and rear edge 35 of the divider wall 52 may be attached to the right, left, and rear inner walls 19, respectively, of the cooking volume 16, for example, by welding and sealant or other attachment method which permanently or removably joins the divider wall 52 to the inner walls 19.

A front edge of the divider wall 52 also supports an elastomeric gasket 58 extending forward sealing against the inner surface of the glass panel 26. The front edge of the divider wall 52 may be tipped from horizontal by an angle 59 so that the generally planar upper surface 62 slopes rearwardly and optionally downward from left to right as indicated by drainage arrow 57. The slope promotes water flow to a rear edge and right corner of the divider wall 52. It is understood that the slope may also assist with drainage to a left edge and left corner of the divider wall 52, as well as toward the rear of the cavity 20, or wherever the drain of the cavity 20 is located.

Installed within the cooking volume 16, above and below the divider walls 52, are shelf assemblies 22 composed of separately removable elements that may be inserted into the cooking volume 16. A wire rack 34 and lower jet plate 42 of the shelf assembly 22 may be installed above the divider walls 52 while an upper jet plate 42' of the shelf assembly 22 is installed below the divider walls 52. An additional upper jet plate 42' may be installed on the top wall of the uppermost cooking cavity 20*a* and an additional wire rack 34 and lower jet plate 42 may be installed on the floor of the lowermost cooking cavity 20*c*.

The uppermost component of the shelf assembly 22, the wire rack 34, is removably insertable above the divider wall 52 and having an outer wire element 36 forming a generally rectangular perimeter defining an edge of the shelf assembly 22. The outer wire element 36 supports a set of parallel wire rods 38 between a front and rear edge of the wire element 36 that may support food items while allowing ample airflow therearound. The outer wire element 36 has, in each corner, a downwardly extending foot 40 serving to support the wire rack 34 in spaced elevation above a generally rectangular and planar upper surface of the lower jet plate 42.

The lower jet plate 42, positioned below the wire rack 34 and above the divider wall 52 (or above the floor of lowermost cavity 20*c*), provides an upper surface perforated by slots and openings 44 and stiffened upwardly extending ribs 46 between a front and rear edge of the lower jet plate 42. A jet plate 42 of this general design is discussed in U.S. Pat. Nos. 10,088,172 and 10,337,745 assigned to the assignee of the present invention and hereby incorporated by reference. As discussed in this reference, the lower jet plate 42 provides an internal channel 79 beneath the upper surface of the jet plate 42 conducting air from a rearward opening edge of the jet plate 42 through the jet plate 42 to exit from the slots and openings 44 as a set of structured air jets 50 through the slots and openings 44.

Figure 4:
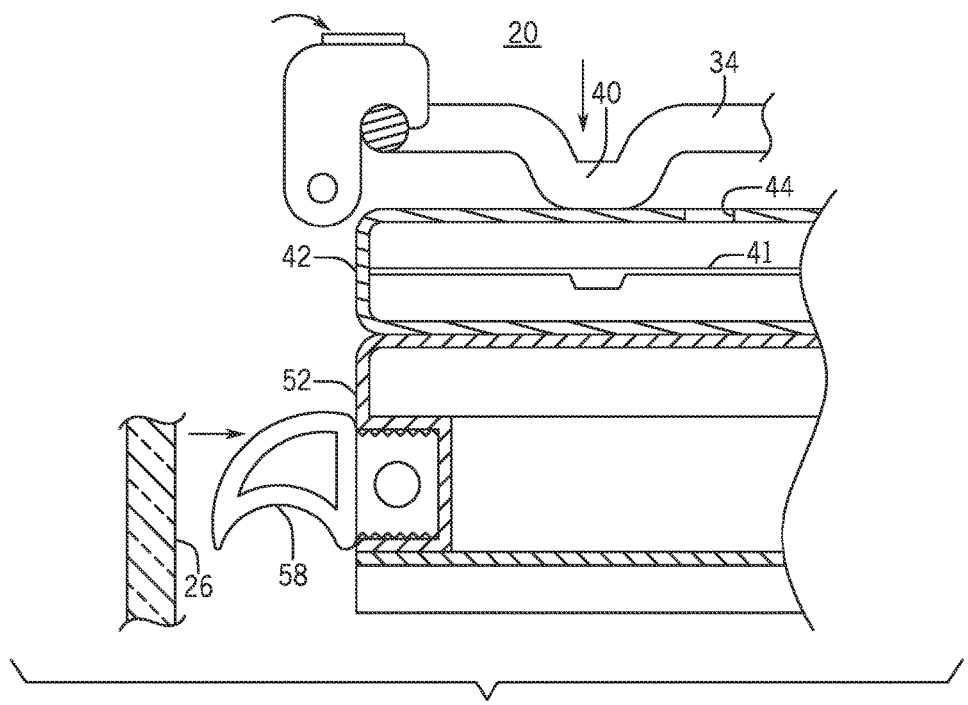
FIG. 4 is a fragmentary, side elevational view in cross-section of a front of the shelf assembly of FIG. 1 showing a forward-facing gasket for compression on the glass panel of the door.

Referring momentarily to FIG. 4, the jet plate 42 may include an internal horizontal baffle 41 changing the cross-sectional area of the jet plate 42 to provide more uniform airflow through the multiple openings 44. Generally, the size of the openings 44 and the cross-section of the channel 79 within the jet plate 42 will change to promote the desired airflow pattern upward onto food supported by the rack 34. The lower surface of the jet plate 42 in the shelf assembly 22 rests on the divider wall 52.

Referring again to FIGS. 2 and 3, positioned beneath the divider wall 52 (or below the ceiling of uppermost cavity 20a), is an upper jet plate 42' of the next lower cavity 20. This jet plate 42' has openings 44' on its under surface to direct structured air jets 50' downwardly and may be identical in structure to jet plate 42 but simply inverted for ease in manufacturing and field use. This upper jet plate 42' may be independently supported on a ledge 60 to be removed and inserted without adjustment or removal of the rack 34 and the lower jet plate 42.

Referring now to FIGS. 3 and 4, the wire rack 34 and lower jet plate 42 may be inserted together or individually as indicated by arrow 69 into a cooking cavity (for example, cavity 20b) by pressing downward as indicated by arrow 71 compressing the shelf assembly against the divider wall 52. In this orientation, a rear edge of the wire rack 34 may fit beneath a capture flange 80 attached to a rear inner wall 19 of the cooking cavity 20b compressing the wire rack 34 and lower jet plate 42 against the upper surface of the divider wall 52. A swivel clip 74 pivotally attached to the inner sidewalls 19 of the cooking cavity 20 may then be pivoted about a pivot point 76 to capture a front edge of the wire rack 34 on a hook portion 78 holding the shelf assembly in compression against the divider wall 52. Generally, the shelf assemblies 22 are intended to be installed and removed repeatedly without damage and without the need for tools. In this position, closure of the door (shown, for example, in FIG. 4) will compress the front gasket 58 against the inner surface of the glass panel 26 completing the sealing process.

Independently Controllable Steam Heater Element

Figure 5:
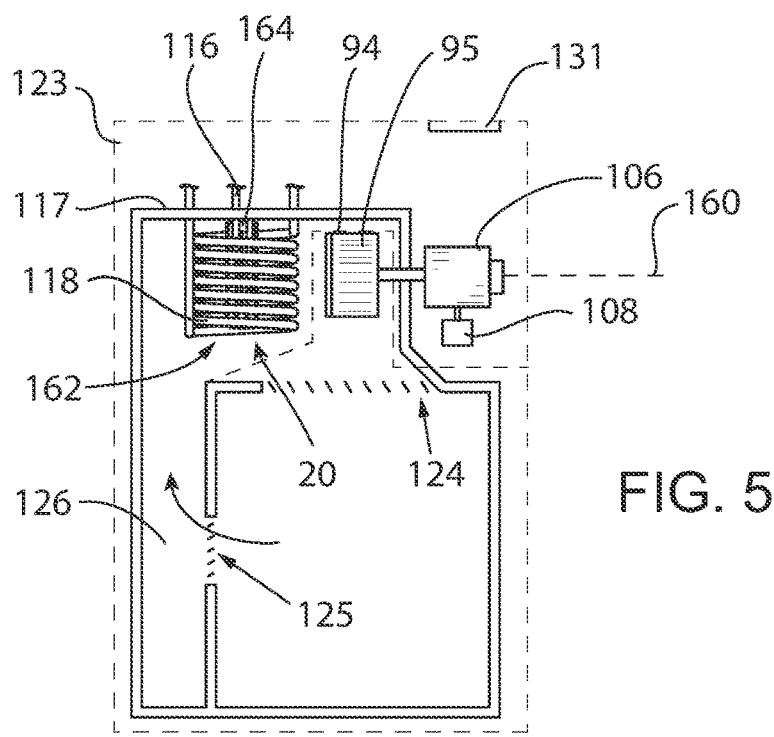
FIG. 5 is a top plan view in cross-section through a cavity of FIG. 1 showing the rear location of a fan heater assembly and an independent steam generator assembly associated with that cavity.

Referring now to FIGS. 3 and 5, positioned rearward from each cavity 20 is a fan 94, for example, being a centrifugal fan having a squirrel cage impeller 95 surrounded by an involute housing 96. The fans 94 may be mounted with rotation of the squirrel cage impeller 95 about a horizontal axis 160 extending from the right to left wall of the oven 10 with the squirrel cage impeller 95 centered with respect to the volume of the cavity 20.

The volume of the housing 96 may provide an opening 98 directing air along a tangent line 99 that is tipped upward with respect to horizontal by about 30 degrees allowing a larger squirrel cage impeller 95 to be fitted within the compact height dimensions of the cavity 20 while still delivering air to the upper and lower jet plates 42. A baffle plate 100 faces the opening 98 at a distance 102 less than a smallest dimension 104 of the opening 98 to provide high turbulence and high resistance to airflow that evens the distribution of airflow into the channels 79 into the upper jet plates 42' and lower jet plates 42. In this respect, the baffle plate 100 may be asymmetric about the tangent line 99 to provide desired partitioning of the airflow and also operate when cleaning solution must be distributed through the jet plates 42.

Referring to FIG. 5, each squirrel cage impeller 95 may be driven by a fan speed-controlled motor 106 operated by convection solid-state motor drive 108. In this respect the squirrel cage impeller 95 propels heated air with the air from each squirrel cage impeller 95 passing into the oven cavity 20 providing convection cooking while also evaporating excess moisture. Heat may be vented by a vent fan 131 or the like. Heated air may be produced by a helical heater tube 118 heating the air and circulating the heated air to the squirrel cage impeller 95 to provide convection cooking with or without the introduction of steam.

The helical heater tube 118 may include approximately six loops or turns as it extends forwardly from the vertical wall 117 from a proximal end 120 to a distal end 121 away from the vertical wall 117 where the distal end 121 of the helical heater tube 118 returns to the vertical wall 117 in a straight line path along an exterior of the coil formed by the helical heater tube 118.

Figure 6:
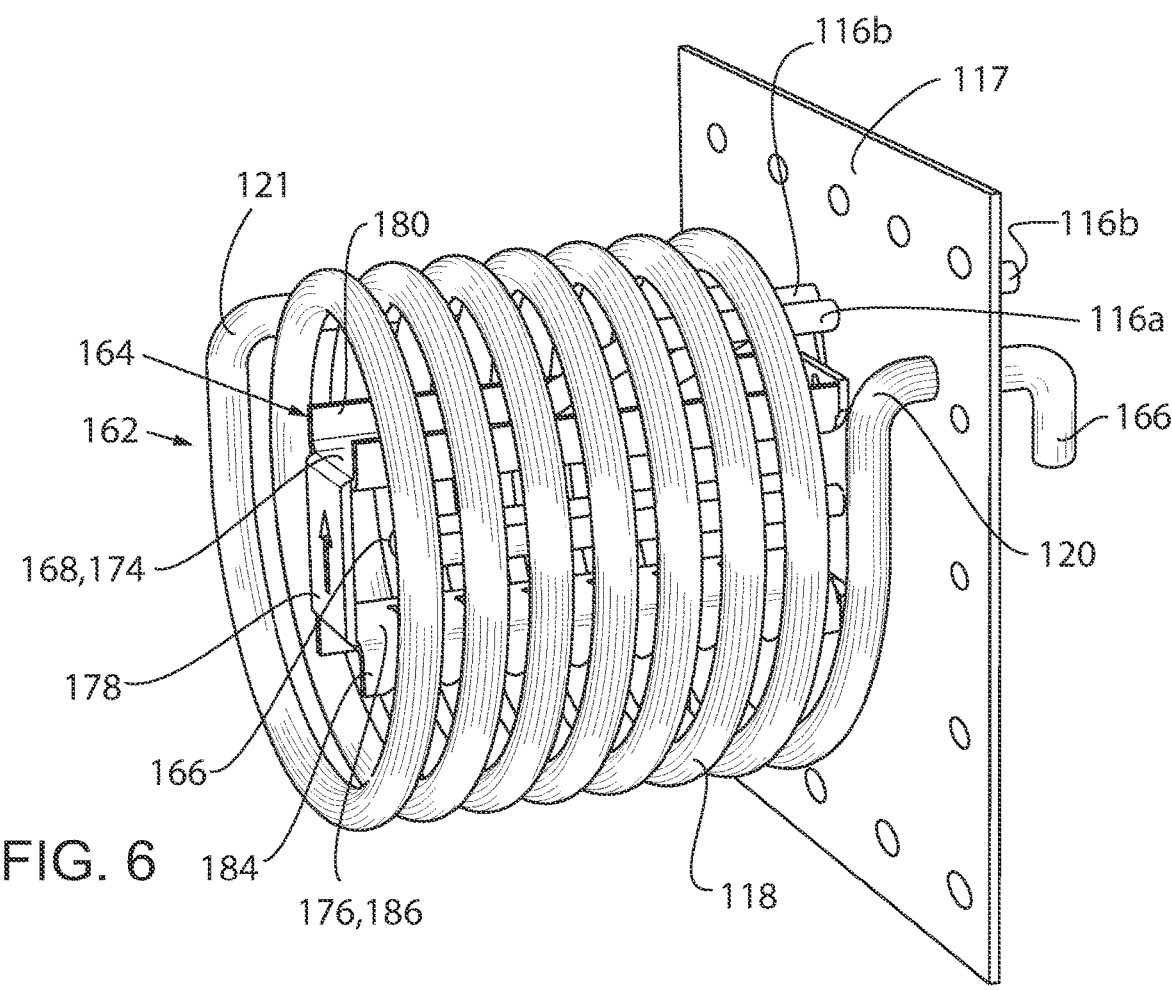
FIG. 6 is a fragmentary perspective view of the steam generator of FIG. 5 showing a helical heater tube surrounding an independent steam generator.
Figure 7:
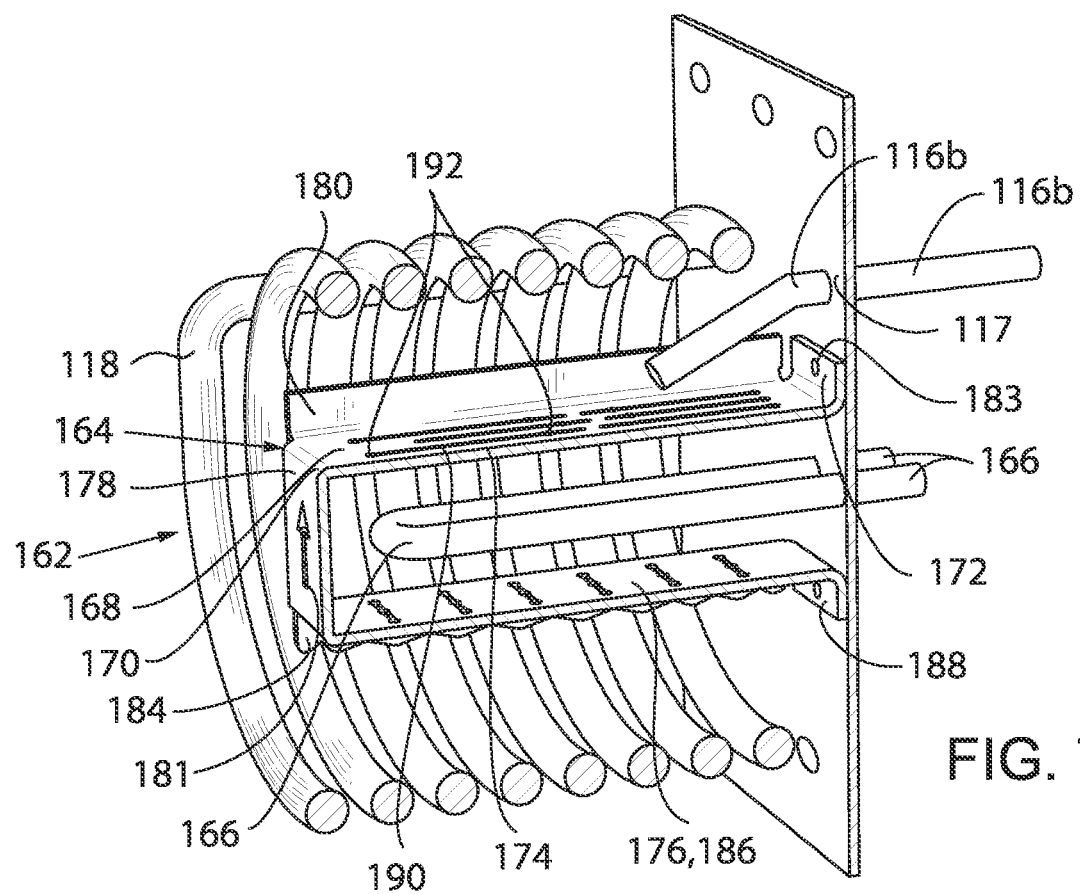
FIG. 7 is a cutaway view of the independent steam generator of FIG. 6 showing the water spray tubes delivering water to an upper surface of a diverter bracket and the diverter bracket flanking auxiliary steam heater tubes.

Turning now to FIGS. 5, 6 and 7, an independent steam generator 162, also positioned rearward from each cavity 20 leftward from the squirrel cage impeller 95 (for example), provides a pair of water injection nozzles 116a, 116b dispensing a stream of water or water droplets onto a diverter bracket 164 flanking auxiliary steam heater tubes 166 and delivering dispersed water to the auxiliary steam heater tubes 166 for steam generation. The pair of water injection nozzles 116a, 116b, diverter bracket 164, and the auxiliary steam heater tubes 166 are supported by and extend forwardly from a vertical wall 117 of the oven 10 located (for example) in an interior space of the oven 10 rearward of each cavity 20.

The water injection nozzles 116a, 116b may dispense a stream or droplets of freshwater onto the diverter bracket 164 which further disperses and delivers the dispersed water onto the auxiliary steam heater tubes 166 and heats the water around or above a boiling temperature of water to produce steam. A first distally positioned injection nozzle 116a may extend forwardly from the vertical wall 117 and dispenses freshwater onto an upper surface 168 of the diverter bracket 164 proximate a distal end 170 of the diverter bracket 164 further from the vertical wall 117. A second proximally positioned injection nozzle 116b may extend forwardly from the vertical wall 117 and dispense freshwater onto the upper surface 168 of the diverter bracket 164 proximate a proximal end 172 of the diverter bracket 164 closer to the vertical wall 117. It is understood that the location of the outlets of the water injection nozzles 116a, 116b deliver water to opposed ends of the diverter bracket 164. It is also understood that any number of water injection nozzles 116 may be used, for example, one, three, four, etc. Water to the injection nozzles 116a, 116b may be controlled by an electronically controlled valve 128 (shown in FIG. 9).

Figure 8:
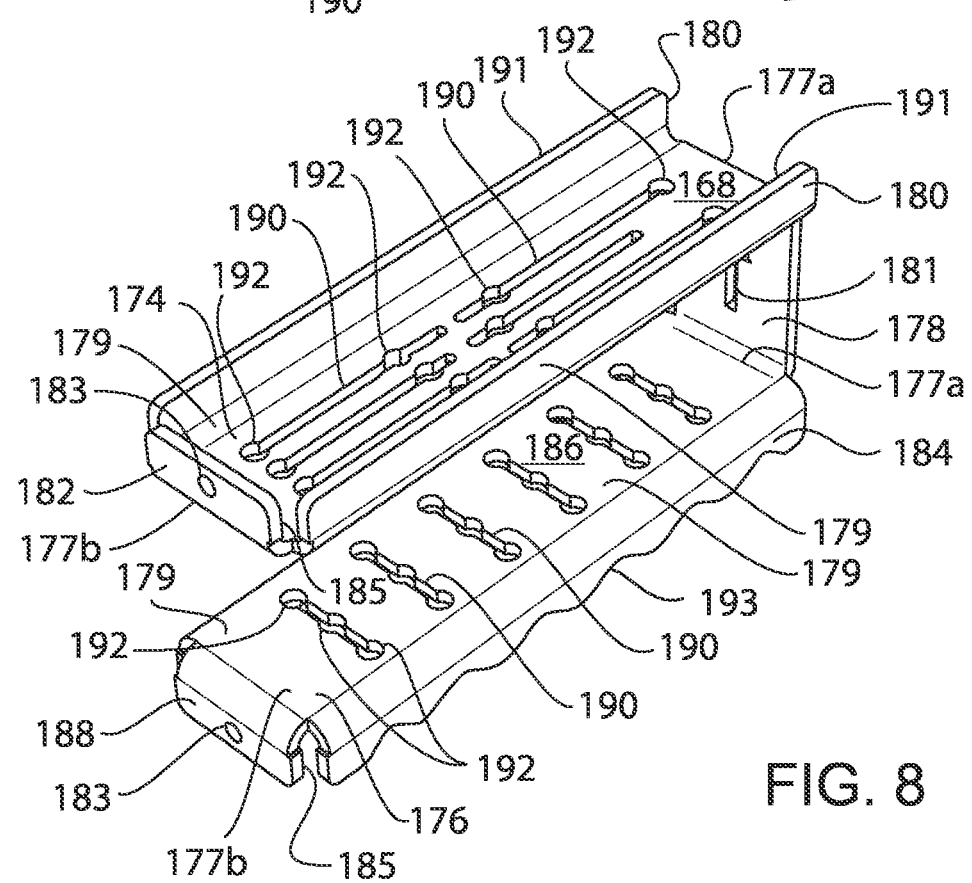
FIG. 8 is a perspective view of the diverter bracket of FIG. 7 showing the slot and dot pattern of the upper and lower walls of the diverter bracket.

Referring to FIGS. 7 and 8, the diverter bracket 164 may include a rectangular upper diverter wall 174 extending substantially horizontally from the vertical wall 117 and a rectangular horizontally extending lower diverter wall 176 extending substantially horizontally from the vertical wall 117 below and parallel to the upper diverter wall 174. The short edges 177 (width) of the upper and lower diverter wall 174, 176 which are attached to the vertical wall 117 are about 1.0 to 2.0 inches and about 1.6 inches, and the long edges 179 (length) of the upper and lower diverter wall 174, 176 which extend from the vertical wall 117 are about 5.0 to 6.0 inches and about 5.5 inches.

The upper and lower diverter walls 174, 176 are joined at a distal short edge 177a of the upper and lower diverter walls 174, 176 by a vertically extending joining wall 178. The distance between the upper and lower diverter walls 174, 176, and height of the vertically extending joining wall 178, may be about 1.0 to 2.0 inches and about 1.5 inches. The width of the vertically extending joining wall 178 may be about 1.0 to 2.0 inches and about 1.6 inches. The vertically extending joining wall 178 may include an arrow symbol 181 or a directional marking indicating the orientation of the upper and lower diverter walls 174, 176 and assisting with installation.

The upper diverter wall 174 may include upwardly extending siderails 180 extending upwardly about a height of 0.4 to 0.6 inches along the opposed long edges 179 of the upper diverter wall 174, and assisting with retaining and holding water between the siderails 180 on the upper surface 168 of the upper diverter wall 174. The upwardly extending siderails 180 may extend substantially perpendicular to the upper diverter wall 174 and have a substantially horizontally extending straight upper edge 191. A proximal end 172 of the upper diverter wall 174 may include an upwardly extending flange 182 extending upwardly about a height of 0.5 to 0.8 inches along the proximal short edge 177b perpendicular to the upper diverter wall 174, and assisting with the attachment of the diverter bracket 164 to the vertical wall 117, for example, by a fastener extending through a hole 183 of the upwardly extending flange 182 to the vertical wall 117. A narrow vertical gap 185 may be present at the corners between the upwardly extending siderails 180 and the left and right edges of the upwardly extending flange 182, respectively, to allow for drainage of excess water held on the upper diverter wall 174.

The lower diverter wall 176 may include downwardly extending siderails 184 extending downwardly about a height of 0.4 to 0.6 inches along the opposed long edges 179 of the lower diverter wall 176 and assisting with receiving water from an upper surface 186 of the lower diverter wall 176 to drip downward along the downwardly extending siderails 184. The downwardly extending siderails 184 may extend substantially perpendicular to the lower diverter wall 176 and may have a wavy or zigzagged lower edge 193 which promotes the drippage of water from the lower edge 193. A proximal end 172 of the lower diverter wall 176 includes a downwardly extending flange 188 extending downwardly about a height of 0.5 to 0.8 inches along the proximal short edge 177b of the lower diverter wall 176, and assisting with the attachment of the diverter bracket 164 to the vertical wall 117, for example, by a fastener through a hole 183 of the downwardly extending flange 188 to the vertical wall 117. A narrow vertical gap 185 may be present at the corners between the downwardly extending siderails 184 and the left and right edges of the downwardly extending flange 188, respectively.

Turning specifically to FIG. 8, the upper and lower diverter walls 174, 176 have upper surfaces 168, 186 perforated by slots and openings 190, 192 extending along their lengths and widths to distribute the retained water and drain the water to prevent water from accumulating on the upper surfaces 168, 186. Accumulated water may undesirably cause water scaling and limescale build up. The slots 190 are narrow channels having a width of about 0.05 to 0.06 permitting the water to run along a length of the upper surfaces 168, 186 while the openings 192 break the surface tension of the water to allow the water to drip down from the diverter bracket 164. For example, the upper diverter wall 174 may include a set of six slots 190 extending along the length of the upper surface 168 (two slots along the length and three slots across the width) with the length of each slot 190 being approximately 1.5 to 2 inches and approximately 1.75 inches. The lower diverter wall 176 may include a set of six slots 190 extending along the width of the upper surface 186 (six slots spaced apart along the length and one slot per width) and the length of each slot 190 may be approximately 1 to 1.5 inches and approximately 1.25 inches. In this respect, the slots 190 of the upper and lower diverter wall 174, 176 may extend in opposite perpendicular directions so that water dripping from the upper diverter wall 174 is caught by the lower diverter wall 176 (instead of dripping directly through the slots and openings 190, 192 of the lower diverter wall 176). Generally, the extent of the slots 190 may cover most of a surface area of the upper surfaces 168, 186.

The slots 190 of the upper and lower diverter walls 174, 176 may be interrupted by openings 192 (two to three openings per slot are shown) positioned along the length of the slots 190, for example, positioned at one or both opposed ends of the slots 190 and/or positioned along the length of the slots 190. The openings 192 may be small round holes having a diameter between 0.1 and 0.2 inches and approximately 0.135 inches in diameter. For example, the upper diverter wall 174 may include two openings 192 per slot 190 with one opening 192 located at the end of the slot 190 toward the short end 177 of the upper diverter wall 174, and one opening 192 positioned along the slot 190 near the opposite end of the slot 192. The lower diverter wall 176 may include three openings 192 per slot 192 with two openings 192 at the opposed ends of the slot 190 and one opening 192 at a midpoint of the slot 190.

The slots 190 allow the water received by the upper and lower diverter walls 174, 176 to be evenly distributed along the length and width of the upper and lower diverter walls 174, 176 and the openings 192 allow the water to drip downward. Therefore, the slots and openings 190, 192 disperse the water more evenly on the auxiliary heater tubes 166. The small size openings 192 cause the drops of water to take the form of small droplets assisting with the formation of steam and reducing damage to the auxiliary steam heater tubes 166.

Referring again to FIGS. 5, 6 and 7, extending between the top and bottom of the diverter bracket 164 are the auxiliary steam heater tubes 166 which may be a pair of U-shaped heater tubes which are arranged side by side and extend from the vertical wall 117 between the upper and lower diverter walls 174, 176 to terminate proximate the vertical joining wall 178. As water drips from the upper diverter wall 174, the water droplets drip down onto the auxiliary steam heater tubes 166 to heat the water and convert the liquid water to steam. Any excess liquid water that is not converted to steam drips past the auxiliary steam heater tubes 166 to fall onto the upper surface 186 of the lower diverter wall 176.

The diverter bracket 164 and injection nozzles 116a, 116b may be surrounded by the helical heater tube 118 that is used to heat air that is received by the squirrel cage impeller 95 to further pass into the oven cavity 20. However, the helical heater tube 118 may also assist with steam generation at higher cooking temperatures when the helical heater tube 118 is operated. As water is expelled from the injection nozzles 116a, 116b, the water spray may be heated by an upper end of the helical heater tube 118 and along a length of the helical heater tube 118, concentrically surrounding the upper and lower diverter walls 174, 176, to produce steam. Any water that is not turned to steam will fall onto the upper diverter wall 174 to be heated by the auxiliary steam heater tubes 166 as discussed above. Then, as excess water drips from the lower diverter wall 176, it is dispersed along the lower end of the helical heater tube 118 and along a length of the helical heater tube 118, concentrically surrounding the upper and lower diverter walls 174, 176, to produce steam.

The water flow path is sufficient to distribute water on both upper and lower inner sides of the helical heater tube 118. By distributing the water evenly along the lower inner surfaces of the helix of the heater tube 118, stress and possible damage to the helical heater tube 118 is reduced.

The helical heater tube 118 is larger and has a higher power rating (e.g., 4200-4300 watt and 4250 watt) than the auxiliary steam heater tubes 166, thus the helical heater tube 118 is not operated when only steam is desired but not an increase in oven temperature. The smaller auxiliary steam heater tubes 166 have a lower power rating (e.g., 300-400 watt and 350 watt) such that their operation does not significantly increase the oven temperature but utilizes most of its energy to produce steam. For example, the helical heater tube 118 may have a power rating that is 10 to 15 times and at least 10 times the power rating of the auxiliary steam heater tubes 166. Therefore, operation of the auxiliary steam heater tubes 166 represents a power savings during an introduction of steam but not an increase in temperature.

The auxiliary steam heater tubes 166 and the helical heater tube 118 are independently controlled to provide separate control of (1) convection heating of the oven cavity 20 without steam generation (the auxiliary steam heater tubes 166 are OFF and the helical heater tube 118 is ON), (2) steam cooking of the oven cavity 20 at lower cooking temperatures (the auxiliary steam heater tubes 166 are ON and the helical heater tube 118 is OFF) and (3) steam cooking at higher cooking temperatures (the auxiliary steam heater tubes 166 are ON and the helical heater tube 118 is ON). It is understood that the ON operation of the auxiliary steam heater tubes 166 and the helical heater tube 118 may be in a pulsed ON and OFF manner. The fan 94 may be operated during both convection modes and steam cooking modes to move hot air and/or steam into each cavity 20.

Generally, this independent steam heating operation can be seen in FIG. 15 where a convection cooking mode 300 is provided when the steam operation is OFF. In the convection cooking mode 300, the oven heater is ON and the steam heater and water jet are OFF (the steam heater may be turned ON to supplement the oven heater) during high cooking temperatures 302, and the oven heater is turned OFF or pulsed or switched ON/OFF and the steam heater and water jet are OFF during low cooking temperatures 304. The fan may be ON during convection cooking to circulate the heated air throughout the cavity.

In the steam cooking mode 306, the steam operation is ON and the oven heater is ON and the steam heater and water jet are ON during high cooking temperatures 308, and the oven heater is turned OFF or pulsed or switched ON/OFF and the steam heater and water jet are ON during low cooking temperatures 310. The fan may be ON during steam cooking to circulate the steam throughout the cavity.

Referring back again to FIGS. 5, 6 and 7, the auxiliary steam heater tubes 166 and the helical heater tube 118 may be positioned in a side compartment 123 behind and to the left of the cavity 20 and to the left of the fan 94 which may receive air from the side compartment 123 to be expelled through the channels 79 (for example, shown in FIG. 3) into the cavity 20 or jet plates 42 if present and returned through a vent 124 at the rear of each cavity 20 and through a side vent 125 and side channel 126 to be re-heated by the auxiliary steam heater tubes 166 and/or helical heater tube 118.

In an alternative embodiment, the helical heater tube 118 and the independent steam generator 162 may be physically separated instead of being nested (but both held outside the cavity 20 and communicating with the cavity 20) so that steam may be provided solely by the independent steam generator 162 at a location physically separate from the heated air of the helical heater tube 118 (the helical heater tube 118 does not assist with steam generation). The independent steam generator 162 could be a ceramic heater (as further described below) or heaters tubes 166, for example as described above, dedicated to receiving water or water droplets from the water injection nozzles 116 to produce steam and communicate steam with the oven cavity 214. The helical heater tube 118 is separately operated from the independent steam generator 162 to provide convection cooking modes and steam cooking modes, respectively. The fan 94 may be operated during both convection modes and steam cooking modes to move hot air and/or steam into each cavity 20, or separate fans may be used for moving hot air from the helical heater tube 118 and steam from the steam generator 162, respectively, into each cavity 20.

Figure 9:
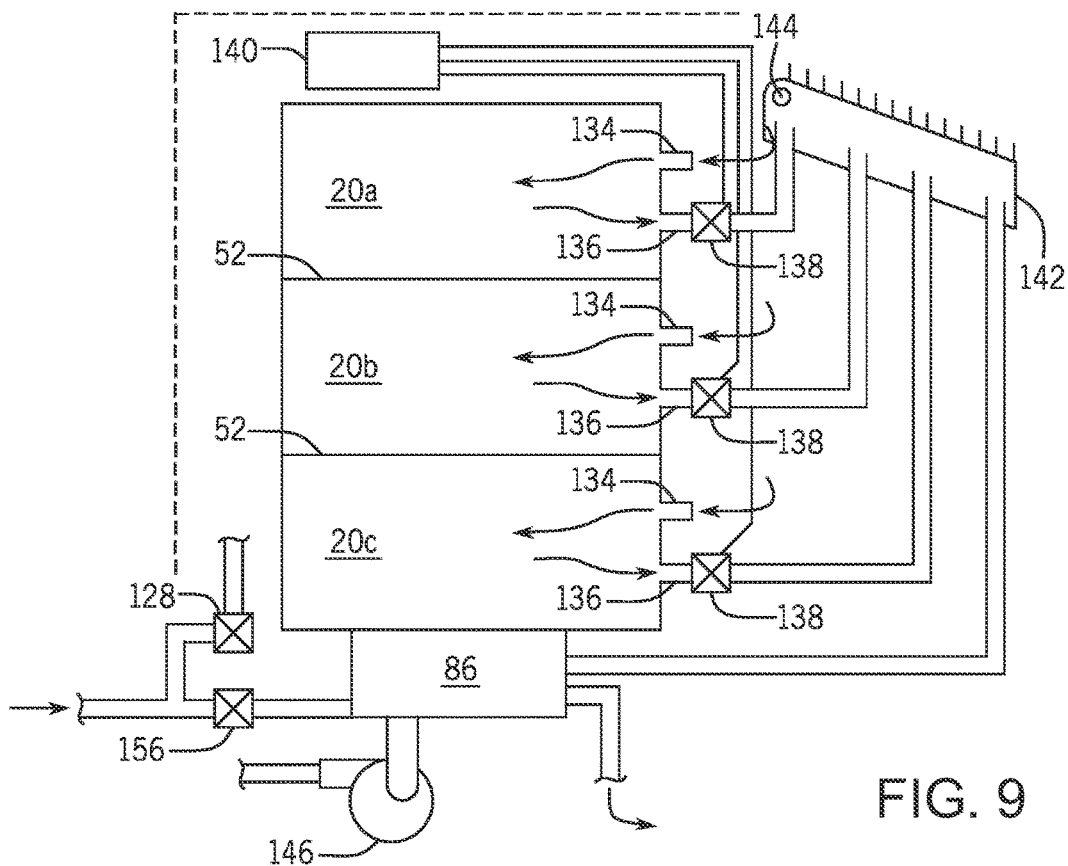
FIG. 9 is a figure showing a diagrammatic connection of inlet and outlet ports to each cavity and a steam condenser unit.

Referring now to FIG. 9, each of the cavities 20 may provide for a fresh air inlet port 134 and an outlet port 136 leading between the cavity 20 and ambient air. Generally, the fresh air inlet ports 134 may be separated so that there is no tendency for steam or humidity to be able to communicate through the fresh airports between cavities 20 without substantial dilution by ambient air. Either the inlet port 134 or the outlet port 136 (in this this case the outlet port 136) may pass through an electronically controlled valve 138 controlled by a controller 140 so that exchange of fresh air or exhausted steam from each cavity 20 may be separately controlled. Steam exhausted through valves 138 may pass upward to a condenser 142 having a cooling surface condensing steam before venting the steam through an opening 144 to the atmosphere. Condensate passes downward along a sloped upper wall of the condenser 142 to be received in the condenser sump 86 where, as activated by the controller 140, a pump 146 may pump water back through a manifold 141 into the cavity 20 for constant recirculation. In this process, a cleaning surfactant or the like may be introduced into the water for improved cleaning ability.

Figure 10:
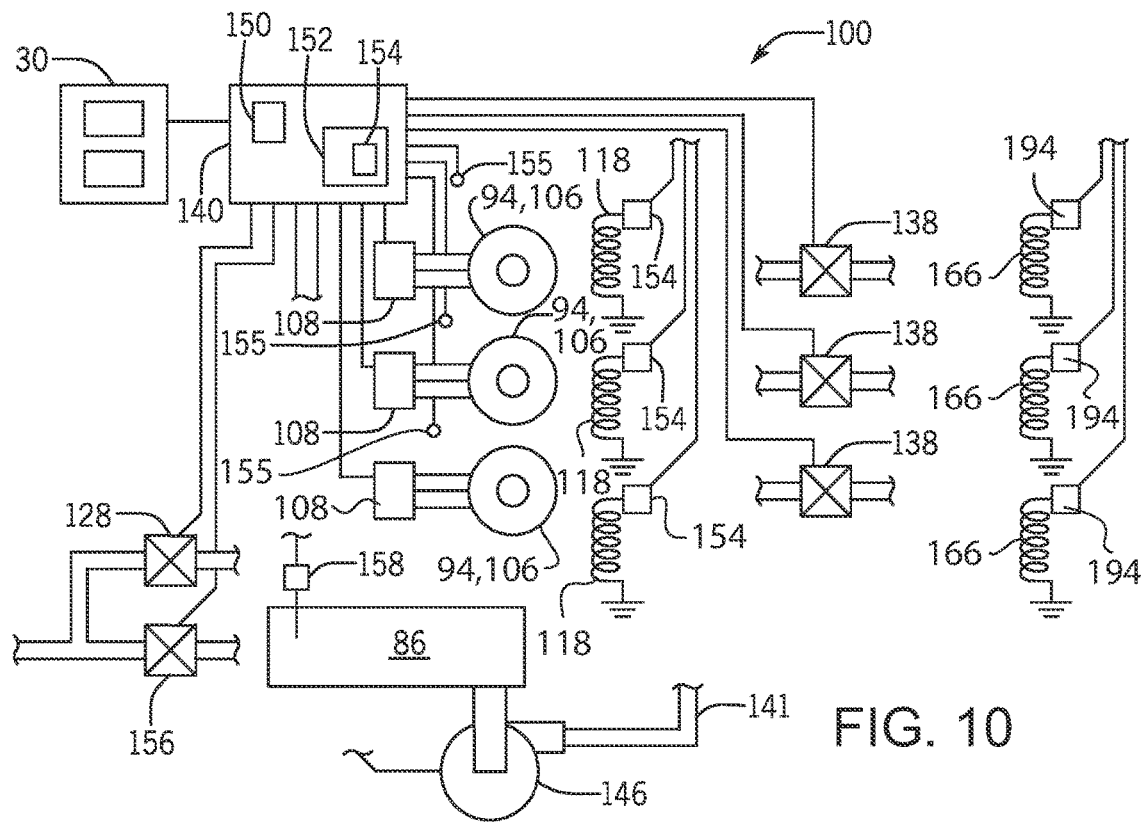
FIG. 10 is a simplified electrical block diagram of a control system of the oven of FIG. 1.

Referring now to FIG. 10, the controller 140 may provide for a microprocessor 150 communicating with a memory 152 holding a stored program executed by the microprocessor 150 for the control of the oven as discussed herein and generally to allow independent temperature and humidity control of each cavity 20 according to predefined schedules. In this regard, the controller 140 may receive input signals from user controls 30 (also shown in FIG. 1), the latter, for example, providing information designating whether convection, steam or combi cooking will be used in each cavity 20, and may provide control signals to each of the valves 138 discussed above. Generally, for each cavity 20, the controller 140 will also communicate with the motor drives 108 associated with each motor 106 for control of motor speed and direction as desired based on these user inputs and/or a cooking schedule. The controller 140 may also receive signals from temperature sensors 155 in each cavity 20 and control signals may be received from the controller 140 by solid-state relays 154 controlling power to the helical heater tube 118 when the heaters are resistance heater coils such as "cal" rods or by corresponding gas valves and gas burner assemblies when the heaters are gas heaters in response to those signals and a cooking schedule and/or use set temperature. Control signals controlling power to the helical heater tube 118 receive signals from temperature sensors 155 in a feedback system to control a set temperature of the oven based on a user input or cooking schedule.

The controller 140 may also receive control signals based on user inputs and/or a cooking schedule to provide a control signal to solid state relays 194 controlling power to the auxiliary steam heater tubes 166 discussed above with respect to preheating (heating prior to the injection of water) and operating the auxiliary steam heater tubes 166, independent and separate from the helical heater tube 118, to create steam when water is introduced to the auxiliary steam heater tubes 166. Controller 140 also provides a control signal to the electronically controlled valve 128 controlling water to the injection nozzles 116a, 116b discussed above in response to user inputs and/or a cooking schedule with respect to introducing water to the auxiliary steam heater tubes 166 to create steam. Distinct from the set temperature of the oven operating the operation of the helical heater tube 118, the auxiliary steam heater tubes 166 are operated based on a steam command based on the user input and/or the cooking schedule.

The controller 140 also controls a freshwater valve 156 providing makeup water to the sump 86, for example, by monitoring the signal of a temperature probe 158 measuring the temperature of that water. In this regard, the controller 140 may add additional water to the sump 86 when the temperature of the water in that sump rises beyond a predetermined level allowing excess heated water to overflow through a drain pipe.

The controller 140 may also adjust a control strategy upon the removal of a shelf assembly 22, for example, by combining readings of associated temperature sensors 155 of the combined cavity 20, for example, by using to an average reading or selecting a maximum reading among temperature probes. In addition, the controller 140 may control fan speed for the two fans 94 of the combined cavity 20 to coordinate the operation of those fans 94 to accommodate the different airflow patterns associated with larger cavities. This is described generally in U.S. Pat. No. 10,088,173 assigned to the assignee of the present application and hereby incorporated by reference. Significantly, in the present invention, when cooking cavities 20 are combined, the generation of steam as described above may be coordinated between the two different auxiliary steam heater tubes 166, for example, using only one set of steam heater tubes 166 for the combined cavities to reduce excess moisture and using the remaining steam heater tubes 166 to provide improved heat recovery or alternatively alternating between the steam heater tubes 166 when steam is generated to reduce scaling buildup and the like. Under this coordination, the generation of steam or the control of heat or the control of venting is no longer independent for the steam generators, heaters, or vents of the combined cooking cavity 20.

Combi-Oven with Independent Steam Heater

Figure 11:
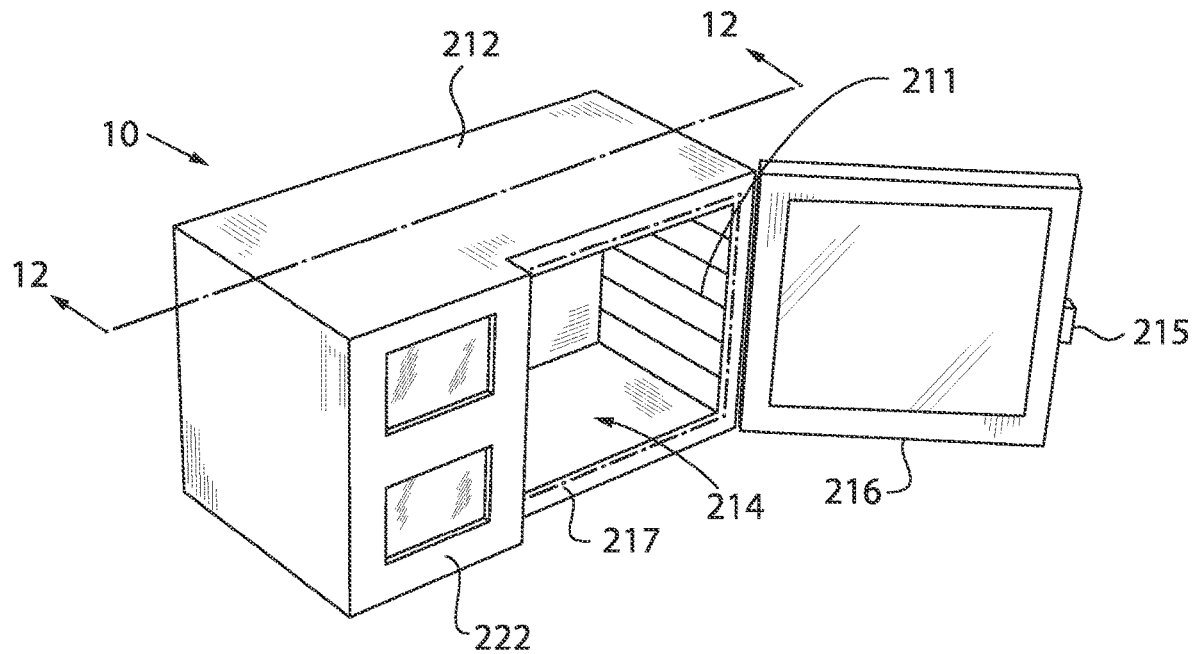
FIG. 11 is a simplified, perspective view of a combination oven constructed according to an alternative embodiment of the present invention showing a housing having an openable door to reveal a single cooking volume and showing a user interface on a front surface of the oven.

Referring now to FIG. 11, many of the above-described inventive features may be applied to an alternative design of the oven 10 providing a single cooking zone or cavity. The oven 10 provides a housing 212 defining an oven cavity 214 with sidewalls of the oven cavity 214 providing for rack supports 211 holding conventional cooking racks for supporting pans or trays of food.

The oven cavity 214 may be accessed through a door 216 connected by a hinge at one vertical side of the oven cavity 214. The door 216 may close over the oven cavity 214 during the cooking operation as held by a latch assembly 215 (visible on the door 216 only). In the closed position, the door 216 may substantially seal against the oven cavity 214 by compressing a gasket 217 surrounding an opening of the oven cavity 214 in the housing 212.

At one side of the oven cavity 214, the housing 212 may support a control panel 222 accessible by a user standing at a front of the oven 10. The control panel 222 may provide conventional electronic controls such as switches, buttons, a touchscreen or the like that may receive oven control data from the user as will be described below.

Figure 12:
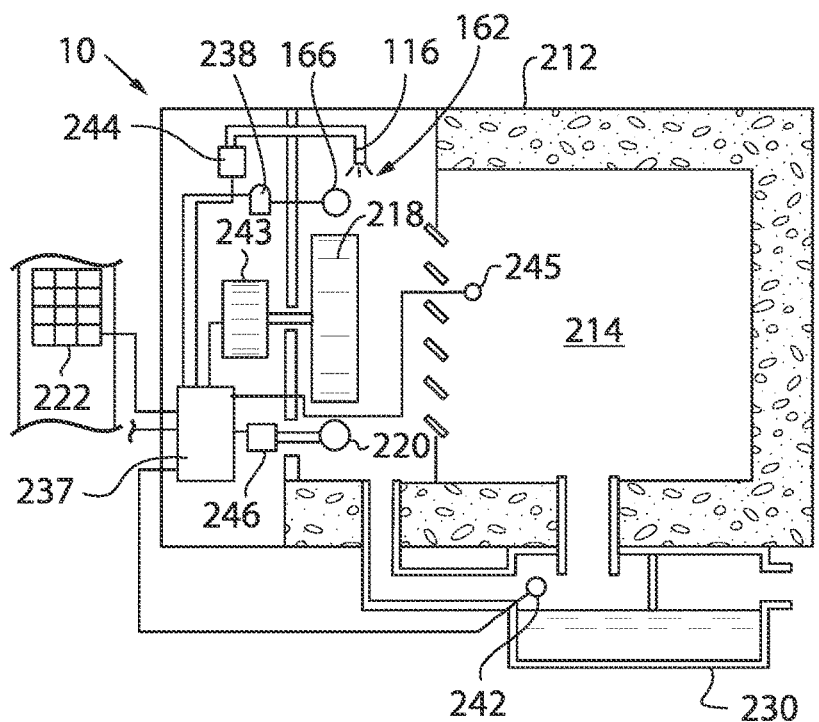
FIG. 12 is a section along line 12-12 of FIG. 11 showing internal components of the combination oven including a fan, heater unit, and separate steam generator with an auxiliary heater unit of the oven.

Referring now also to FIG. 12, a motor-driven fan 218 may be positioned within the housing 212 to direct a stream of air across a heater element 220 into the oven cavity 214. The heater element 220 may be an electric heating element or a heat exchanger receiving heat from a gas flame or the like and may surround the fan 218.

Ovens of this type are commercially available from the Alto-Shaam Inc. of Menomonee Falls, Wis. and are described generally in U.S. Pat. Nos. 7,307,244; 6,188,045; and 9,841,261 assigned to the assignee of the present invention and hereby incorporated by reference.

Steam may be introduced into the oven cavity 214, for example, by an independent steam generator 162 positioned within the housing 212 to produce steam that is introduced into the oven cavity 214. Steam may be provided by the independent steam generator 162, for example, a ceramic heater or heaters tubes 166, dedicated to receiving water or water droplets from water injection nozzles 116 to produce steam and communicate with the oven cavity 214.

In one embodiment, the ceramic heater, as is understood in the art, comprises a block of ceramic material surrounding high resistance electrical conductors such as nickel chromium iron alloy wire, the latter that may receive an electrical current to produce resistive heating of the high resistance electrical conductors. The temperature of the electrical conductors is moderated by rapid conduction of heat from the electrical conductors into the ceramic material which serves to spread and dissipate the heat within the ceramic material. The ceramic material provides uniform radiant energy. Generally, the ceramic material presents a high mass, high power handling material that may be differentiated, for example, from a low mass, high temperature heater such as halogen light bulbs, and which provides improved temperature stability and uniformity.

In an alternative embodiment, the independent steam generator 162 may include a pair of water injection nozzles 116a, 116b dispensing a stream of water or water droplets onto a diverter bracket 164 and further onto an auxiliary steam heater tubes 166, as described above with respect to FIGS. 5 through 7. The introduction of steam into the oven cavity 214 may be facilitated by an air stream created by the fan 218.

An internal controller 237 may be positioned within an equipment cavity adjacent to the oven cavity 214 but maintained at a cooler temperature. The controller 237 provides a computer processor providing a processor and associated memory, for example, flash memory, for executing a program held in the associated memory. Execution of the program may generate control signals output by interface circuitry of the controller 237 to components of the oven 10 and may read sensed signals from the user and various sensors within the oven 10. For example, the controller 237 may receive signals from temperature sensor 242 in the condenser chamber 230, one or more internal oven temperature sensors 245 in the oven cavity 214, each providing temperature signals, as well as signals from the control panel 222 providing user commands.

The controller 237 may output convection control signals to a motor 243 operating the fan 218 (to control a convection mode of the oven 10). In addition, the controller 237 may provide a heat power signal to a heater controller 246 controlling heating elements 220 according to user input or a cooking recipe inputted into the control panel 222.

In addition, the controller 237 may output steam control signals to a valve 244 communicating between a water supply and the water injection nozzles 116 to generate steam. In addition, the controller 237 may provide a heat power signal to a heater controller 238 controlling the auxiliary steam heater tubes 166, independent and separate from heating elements 220, according to user input or a cooking recipe inputted into the control panel 222. In this respect, the auxiliary steam heater tubes 166 may be operated when the heating elements 220 are not operated in order to provide for steam cooking mode but not convection mode of the oven 10 when the temperature of the oven cavity 214 is to be maintained or kept at a low temperature. The fan 218 may be operated during steam cooking mode in order to assist with the movement of steam into the oven cavity 214.

Modular Oven with Different "Mix and Match" Cooking Operations

Figure 13:
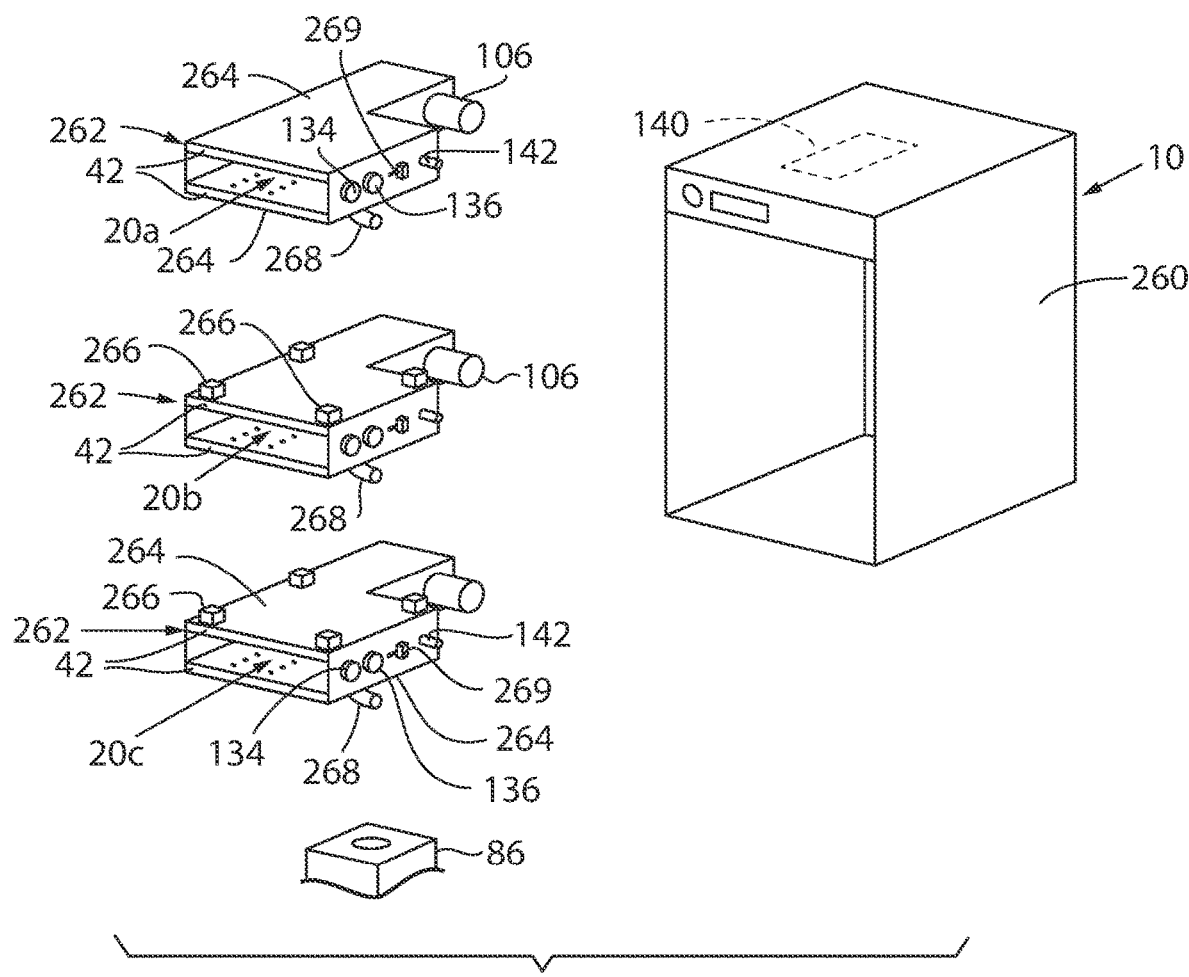
FIG. 13 is an exploded perspective view of a modular oven constructed according to an alternative embodiment of the present invention employing self-contained modular cavities without removable divider walls.
Figure 14:
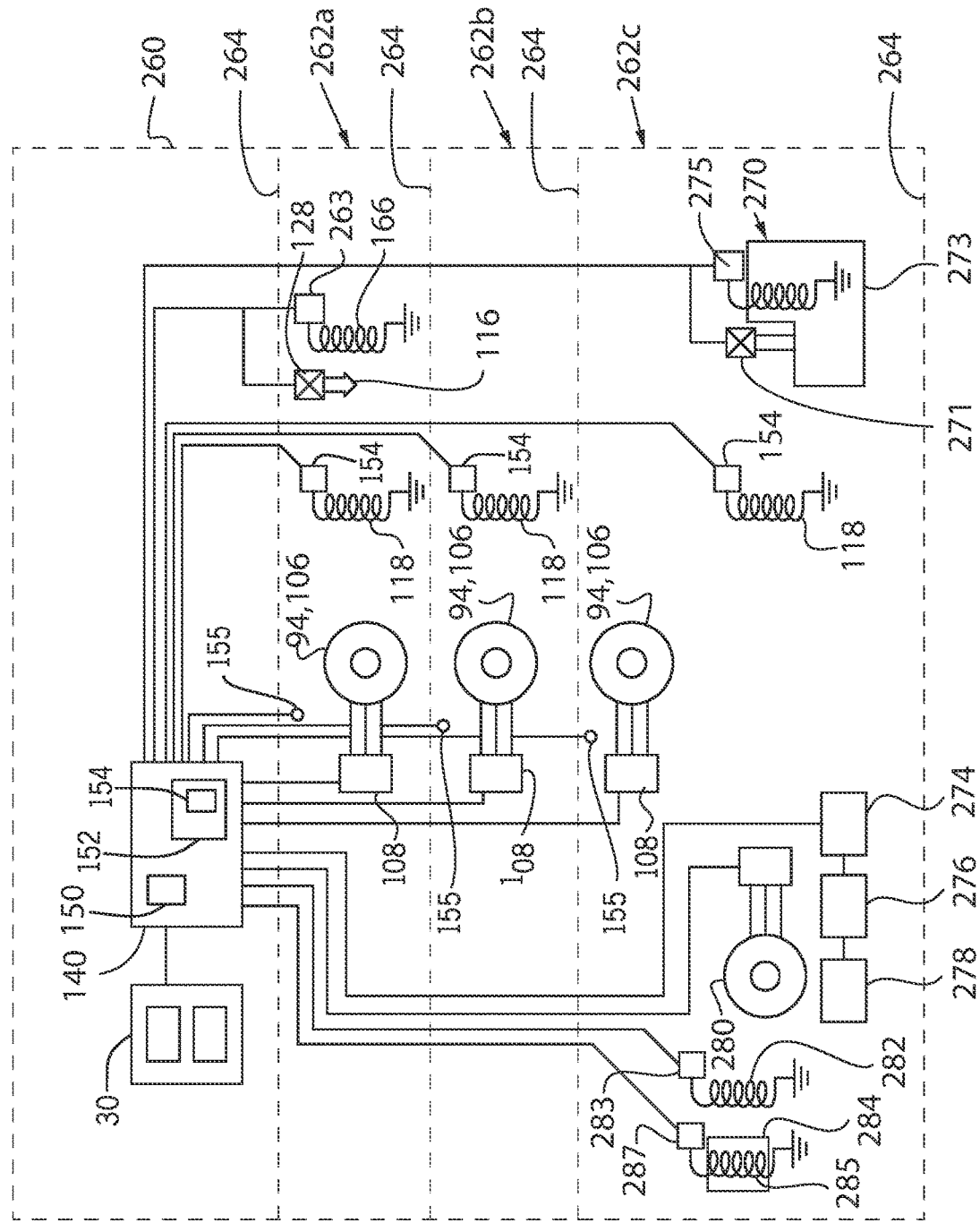
FIG. 14 is a simplified electrical block diagram of a control system of the modular oven of FIG. 13.

Referring to FIGS. 13 and 14, the above described inventive features may be applied to an alternative design of the oven 10 described above with respect to FIG. 1 providing an outer cabinet 260 for supporting and receiving multiple independent oven modules 262 at multiple vertical module locations. Each oven module 262 provides a separate housing supporting upper and lower jet plates 42 to independently implement cavities 20a-20c. Notably, the oven modules 262 do not have removable divider walls 52 which are replaced by nonremovable upper and lower walls 264 (for example, permanently welded to the sidewalls) of each oven module 262. Modules 262 may be stacked on each other as separated by spacers 266 providing exit room for a drain tube 268 positioned, for example, central to the bottom wall 264. The drain tubes 268 may be interconnected to a common sump 86.

Each of the oven modules 262 may have a self-contained and independently operable helical heater tube 118 controlled by solid-state relays 154, fan 94, motor 106, motor drive 108, and temperature sensor 155 (for example, seen in FIG. 14, which is similar to FIG. 10 but showing the separate modules 262 of the oven 10) and may provide for a harness 269 allowing electrical connection to a central controller 140 in the cabinet 260 when the modules 262 are assembled therein. The controller 140 sends signals to the solid state relays 154 and motor drive 108 depending on signals from the temperature sensor 155 to control the temperature of the cooking cavities 20a-20c.

Some of the oven modules 262, for example, at least one module 262 held within the cabinet 260, may have injection nozzles 116 which may connect through a valve 128 controlling water to the nozzle 116 described above with respect to FIG. 14. The modules 262 may also have independently operable auxiliary steam heater tubes 166 (for example, seen in FIGS. 5 to 7) having solid state relays 263 controlling power to the auxiliary heater tubes 166 based on signals from the controller 140 indicating steam production. The auxiliary steam heater tubes 166 heat the water spray or droplets from the injection nozzles 116 to convert the water into steam as described above. The modules 262 could alternatively include ceramic heaters as described above that heat the water spray or droplets from the injection nozzles 116 in a similar manner as the auxiliary steam heater tubes 166. The water source for the injection nozzles 116 of each module 262 may be self-contained within each module 262, for example, a water tank refillable by the user, so that no external water source is needed.

In an alternative embodiment, each or some of the oven modules 262 may instead of the nozzle 116 and independently operable auxiliary steam heater tubes 166 include a boiler 270 having a dedicated heater element 272 and solid state relays 275 controlling power to the dedicated heater element 272 based on signals from the controller 140 and heating the water within a water tank 273 of the boiler 270 receiving water from the water source, which may be self-contained within each module 262 so that no external water source is needed, passing through tank filling valves 271. The heater element 272 and tank filling valves 271 communicate with the central controller 140 to receive control signals controlling their operation depending on the cooking recipe or user input for steam production.

The oven module 262 may further include inlet port 134 and outlet port 136, one of which may connect to a valve 138 and passing to the condenser 142 condensing the steam before venting the steam described above with respect to FIG. 8. The drain receptable receiving moisture from the drain port 258 may be self-contained within each module 262, for example, a receptacle emptied by the user, so that no external plumbing needs to be installed.

Each or some of the oven modules 262 may include additional elements to assist with high speed cooking within the module 262. Some of the oven modules 262, for example, at least one module 262 held within the cabinet 250 may have a self-contained and independently operable magnetron 274, capacitor 276, transformer 278, and blower 280 so that microwave cooking can be introduced into the cavity of the module 262, as understood in the art, by electrical signals to the magnetron 274 and blower 280 from the central controller 140 to allow for independent microwave cooking to the module 262 according to a cooking schedule or user input.

In a similar manner, some of the oven modules 262, for example, at least one oven module 262 held within the cabinet 250, may have a self-contained and independently operable infrared radiants 282 such as calrod heaters so that infrared or radiant cooking can be introduced into the cavity of the module 262 by electrical signals to solid state relays 283 from the central controller 140 to the infrared radiants 282 according to a cooking schedule.

In a similar manner, some of the oven modules 262, for example, at least one module 262 held within the cabinet 250, may include high thermal mass material 284 such as a cast iron or ceramic blocks that presents high mass, high power handling material and direct heating through direct contact of food placed directly on the high thermal mass material 284. The high thermal mass material 284 may surround high resistance electrical conductors 285 such as nickel chromium iron alloy wire, that may receive an electrical current by electrical signals to solid state relays 287 to produce resistive heating of the high resistance electrical conductors. The temperature of the electrical conductors is moderated by rapid conduction of heat from the electrical conductors into the high thermal mass material 284 which serves to spread and dissipate the heat within the high thermal mass material 284. The high thermal mass material 284 provides uniform radiant energy.

Mechanisms for high speed cooking in the cavity of each module 162 suitable for the present invention are described, for example, in U.S. Pat. No. 10,599,391 assigned to the assignee of the present application and hereby incorporated by reference.

The above high speed cooking mechanisms described above for microwave, infrared or radiant, and direct cooking may be used in combination and with conventional convection cooking, steam cooking, and impingement cooking described above in order to speed up cooking rates.

By using this modular approach, modules 262 with different cooking operations and features may be mixed and matched according to the needs of the user. For example, as illustrated in FIG. 14, the cabinet 260 may receive a first module 262a which provides for convection and/or steam cooking in the cavity 20a, a second module 262b which provides for convection cooking without steam cooking or without the introduction of water into the cavity 20b, and a third module 262c which provides for convection cooking, steam cooking, and/or additional high speed cooking mechanisms for microwave, infrared and/or direct cooking in the cavity 20c.

Independently available cooking operations include steaming, baking, grilling and air frying and may at least in part be dependent on a temperature, fan speed, cook time and humidity level of each cooking cavity. The cooking operation of each cooking cavity may be operated independently and simultaneously for more flexible cooking of multiple different food types.

It is understood that the central controller 140 may be used to control the operation of features of each module 262. Each of the modules 262 may be removed and replaced from the outer cabinet 260 such that the modules 262 are interchangeable and replaceable within the outer cabinet 260 in any order and arrangement.

Module cooking ovens suitable for the present invention are described, for example, in U.S. Pat. No. 10,986,843 and US publication 2021/0247075, assigned to the assignee of the present application and hereby incorporated by reference.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

We claim:

1. A combination oven comprising:
   an insulated housing including a door configured to close to define an interior cooking cavity and an opening to provide access to the cooking cavity;
   a cooking cavity heater communicating with the cooking cavity to heat the cooking cavity; and
   a steam generator for producing steam within the cooking cavity according to a steam production signal, the steam generator having
      a first diversion plate having an upper surface opposite a lower surface extending along a horizontal axis and providing a plurality of perforations,
      a water nozzle positioned to direct water onto the upper surface of the first diversion plate to collect water thereon, and
      an auxiliary heater independent of the cooking cavity heater extending below the first diversion plate to promote vaporization.

2. The combination oven of claim 1 further comprising a heating coil extending around the first diversion plate.

3. The combination oven of claim 1 further comprising a second diversion plate having an upper surface opposite a lower surface extending along the horizontal axis below the first diversion plate, wherein the first and second diversion plate are parallel plates.

4. The combination oven of claim 3 wherein the auxiliary heater extends between the first and second parallel plates.

5. The combination oven of claim 1 wherein the plurality of perforations comprise slots and dots arranged in a pattern that modulates steam release rate based on water flow characteristics.

6. The combination oven of claim 3 wherein the plurality of perforations are slots extending in a first direction on a first parallel plate and in a second direction on a second parallel plate wherein the first direction and second direction are substantially perpendicular.

7. The combination oven of claim 6 wherein the first parallel plate provides upwardly extending sidewalls and the second parallel plate provides downwardly extending sidewalls.

8. The combination oven of claim 1 further comprising a controller communicating with the cooking cavity heater, steam generator, auxiliary heater, and executing a program stored in memory to independently control the cooking cavity heater and the auxiliary heater according to a power setting of the oven.

9. The combination oven of claim 8 wherein a first power setting generates a steam production signal, turns on the auxiliary heater, and turns on the cooking cavity heater, and a second power setting generates the steam detection signal, turns on the auxiliary heater, and turns off or pulses on/off the cooking cavity heater.

10. The combination oven of claim 9 wherein a third power setting does not generate a steam production signal, turns on the auxiliary heater, and turns on the cooking cavity heater, and a second power setting does not generate the steam detection signal, turns off the auxiliary heater, and turns off or pulses on/off the cooking cavity heater.

11. A combination oven comprising:
- an insulated housing including a door configured to close to define an interior cooking cavity and an opening to provide access to the cooking cavity;
- a cooking cavity heater communicating with the cooking cavity to heat the cooking cavity;
- a steam generator for producing steam within the cooking cavity according to a steam production signal, the steam generator having
  - a first diversion plate having an upper surface opposite a lower surface extending along a horizontal axis and providing a plurality of perforations,
  - a water input jet is positioned to direct water onto the upper surface of the first diversion plate to collect water thereon, and
  - a steam generator heater independent of the cooking cavity heater extends below the first diversion plate to promote vaporization;
- a temperature sensor for sampling a temperature of the cooking cavity to provide a temperature signal;
- a controller communicating with the cooking cavity heater, steam generator, steam generator heater, temperature sensor, and executing a program stored in memory to:
  - (i) control the cooking cavity heater according to the temperature signal;
  - (ii) control the steam generator heater according to a power setting of the oven
- wherein when the cooking cavity heater is operating at a first power setting generate a steam production signal, turn on the steam generator heater, and turn on the cooking cavity heater, and when the cooking cavity is operating at a second power setting generate the steam detection signal, turn on the steam generator heater, and turn off the cooking cavity heater.

12. The combination oven of claim 11 wherein when the cooking cavity heater is operating at a third power setting and does not generate a steam production signal, turn on the steam generator heater and turn on the cooking cavity heater, and when the cooking cavity heater is operating at a fourth power setting and does not generate a steam production signal turn off the steam generator heater and turn off or pulse on/off the cooking cavity heater.

13. The combination oven of claim 11 wherein the cooking cavity heater is a heating coil extending around the first diversion plate.

14. The combination oven of claim 11 further comprising a second diversion plate having an upper surface opposite a lower surface extending along the horizontal axis below the first diversion plate, wherein the first and second diversion plates are parallel plates.

15. The combination oven of claim 14 wherein the steam generator heater extends between the first and second parallel plates.

16. The combination oven of claim 11 wherein the plurality of perforations comprise slots and dots arranged in a pattern that modulates steam release rate based on water flow characteristics.

* * * * *